(12) United States Patent
Ohkawara

(10) Patent No.: US 6,526,649 B2
(45) Date of Patent: Mar. 4, 2003

(54) MANUFACTURING METHOD OF MAGNETO-RESISTIVE EFFECT TYPE HEAD

(75) Inventor: Shigehisa Ohkawara, Miyagi (JP)

(73) Assignee: Sony Corporation, Tokyo (JP)

( * ) Notice: Subject to any disclaimer, the term of this patent is extended or adjusted under 35 U.S.C. 154(b) by 53 days.

(21) Appl. No.: 09/872,105

(22) Filed: Jun. 1, 2001

(65) Prior Publication Data

US 2002/0017018 A1 Feb. 14, 2002

(30) Foreign Application Priority Data

Jun. 2, 2000 (JP) .................................... 2000-166149

(51) Int. Cl.$^7$ .............................................. G11B 5/127
(52) U.S. Cl. .............................. 29/603.07; 29/603.09; 29/603.15; 29/603.16; 29/603.18
(58) Field of Search .................... 29/603.07, 603.09, 29/603.12, 603.13, 603.14, 603.15, 603.16, 603.18; 360/119, 122, 126

(56) References Cited

U.S. PATENT DOCUMENTS 5,225,953 A * 7/1993 Wada et al. ............. 29/603.27
5,640,754 A * 6/1997 Lazzari et al. ................ 216/16
5,876,843 A * 3/1999 Ishiwata ..................... 324/252
6,178,065 B1 * 1/2001 Terunuma et al. .......... 360/119
6,299,507 B1 * 10/2001 Katoh et al. ................... 216/88

* cited by examiner

Primary Examiner—Gregory Huson
Assistant Examiner—Peter deVore
(74) Attorney, Agent, or Firm—Sonnenschein, Nath & Rosenthal

(57) ABSTRACT

To present a manufacturing method of a magneto-resistive effect type head capable of manufacturing a magneto-resistive effect type head with stabilized head characteristics. A magneto-resistive effect type head is manufactured in a method comprising a step of forming a magneto-resistive effect film (30) in a trapezoidal shape (30A) having a specified abutting angle θ1 by means of ion milling through a resist mask of overhang structure, a step of forming bias magnet films (31) for filling in sides of the magneto-resistive effect film (30), and a step of forming an electrode film (33) to overlap partly with the magneto-resistive effect film (30) through the resist mask. The angle of the ion milling is 5° or less to the normal of the substrate surface. The angle of ion beam sputtering when forming the electrode film (33) is 30° or less to the normal of the substrate surface. At the step of for forming the trapezoidal shape (30A), the anti-ferromagnetic layer is etched to the position of 30% or less of its depth. A TiW film of 3 nm to 5 nm in thickness is used inn the base film (32) of the bias magnet film (31).

8 Claims, 5 Drawing Sheets

MANUFACTURING METHOD OF MAGNETO-RESISTIVE EFFECT TYPE HEAD

RELATED APPLICATION DATA

The present application claims priority to Japanese Application No. P2000-166149 filed Jun. 2, 2000, which application is incorporated herein by reference to the extent permitted by law.

BACKGROUND OF THE INVENTION

The present invention relates to a manufacturing method of a magneto-resistive effect type head formed by having a magneto-resistive effect element.

Generally, a thin film magnetic head is a magnetic head composed by laminating a magnetic film, an insulating film, and other thin films in multiple layers, and forming conductor coils, lead wires, and terminals. This thin film magnetic head is formed by vacuum thin film forming technology, and is hence characterized by ease of micronizing the dimensions such as a narrow track and narrow gap, and high resolution recording, and is noticed as a magnetic head applicable to high density recording.

For example, a thin film magnetic head for recording and reproducing information signals in and from a magnetic recording medium is composed by forming a conductor coil and a magnetic film by vacuum thin film forming technology on a substrate composed of oxide magnetic material such as ferrite.

Specifically, a preferred thin film magnetic head for recording is a so-called inductive type magnetic head.

This inductive type magnetic head is used by mounting on a hard disk drive or the like as a composite type thin film magnetic head together with, for example, a magneto-resistive effect type thin film magnetic head (MR head) for reproduction.

In this composite type thin film magnetic head, the magneto-resistive effect type thin film magnetic head (MR head) is narrowed in the width of reproduction track as the recording density becomes higher.

As one of structures of magneto-resistive effect element (MR element) for the above-mentioned MR head for reproduction, it is proposed that a magneto-resistive effect film (MR film) with magneto-resistive effect be composed of a so-called spin valve element.

The spin valve element is formed by having two ferromagnetic films be opposed to each other via a nonmagnetic film, disposing an anti-ferromagnetic layer at one ferromagnetic film side, using this ferromagnetic layer as a fixed layer being fixed in the direction of magnetization, and setting the other ferromagnetic film as a free layer freely rotating in the direction of magnetization by an external magnetic field. By rotation (spin) of this free layer in the direction of magnetization, the resistance or voltage is changed.

In the MR head using this spin valve element in the MR film, bias magnet films composed of hard magnetic films are disposed at both sides of the MR film, and a specific bias magnetic field is applied to the MR film so that the magnetic characteristic of the free layer is stabilized.

In the MR head of this structure, the width of the reproduction track is defined as the effective width of the MR film (hereinafter called a reproduction width).

When the reproduction width of the MR film becomes narrower, as compared with the case of a wide reproduction width, slight changes of the adjacent bias magnetic film and electrode film are likely to affect the characteristic (stability) of the MR head, which is estimated to be due to the shape of the junction between the MR film and bias magnet film, or the state of the electrode film.

SUMMARY OF THE INVENTION

To solve these problems, the present invention is to present a manufacturing method of a magneto-resistive effect type head capable of manufacturing a magneto-resistive effect type head with a stabilized characteristic of the head.

The manufacturing method of magneto-resistive effect type head of the invention is a manufacturing method of magneto-resistive effect type head for manufacturing a magneto-resistive effect type magnetic head composed by forming on a substratea a magneto-resistive effect element having a fixed layer composed of an anti-ferromagnetic layer and a magnetic layer thereon, a nonmagnetic conductive layer on the fixed layer, and a free layer further thereon, and forming bias magnets on both sides of the magneto-resistive effect element, comprising a step of forming a magneto-resistive effect film in a trapezoidal shape having a specified abutting angle by means of ion milling through a resist mask of overhang structure, in which the angle of ion milling is 5° or less to the normal of the substrate surface.

According to the manufacturing method of the invention, by comprising the step of forming a magneto-resistive effect film in a trapezoidal shape having a specified abutting angle by means of ion milling through a resist mask of overhang structure, in which the angle of ion milling is 520 or less to the normal of the substrate surface, the abutting angle of the trapezoidal magneto-resistive effect film can be set at 15° or more to the substrate surface.

The manufacturing method of magneto-resistive effect type head in another aspect of the invention is a manufacturing method of a magneto-resistive effect type head for manufacturing a magneto-resistive effect type magnetic head composed by forming on a substrate a magneto-resistive effect element having a fixed layer composed of an anti-ferromagnetic layer and a magnetic layer thereon, a nonmagnetic conductive layer on the fixed layer, and a free layer further thereon, and forming bias magnets on both sides of the magneto-resistive effect element, comprising a step of forming a magneto-resistive effect film in a trapezoidal shape having a specified abutting angle by means of ion milling through a resist mask of overhang structure, a step of forming bias magnet films for filling in sides of the trapezoidal magneto-resistive effect film, and a step of forming an electrode film to overlap partly with the magneto-resistive effect film through the resist mask, in which the angle of ion beam sputtering when forming the electrode film is 30° or less to the normal of the substrate surface.

According to the manufacturing method of the invention, by comprising a step of forming a magneto-resistive effect film in a trapezoidal shape having a specified abutting angle by means of ion milling through a resist mask of overhang structure, a step of forming bias magnet films for filling in sides of the trapezoidal magneto-resistive effect film, and a step of forming an electrode film to overlap partly with the magneto-resistive effect film through the resist mask, in which the angle of ion beam sputtering when forming the electrode film is 30° or less to the normal of the substrate surface, it becomes possible to effectively decrease invasion of the electrode film into the bottom of the resist mask of overhang structure As a result, it becomes possible to effectively control the position of the edge of the electrode film in the width direction on the magneto-resistive effect film in a way for it to come to an outer side position, for example, to a dead magnetic zone not contributing to detection of magnetic field from a magnetic recording medium.

The manufacturing method of a magneto-resistive effect type head in another aspect of the invention is a manufacturing method of a magneto-resistive effect type head for manufacturing a magneto-resistive effect type magnetic head composed by forming on a substrate a magneto-resistive effect element having a fixed layer composed of an anti-ferromagnetic layer and a magnetic layer thereon, a nonmagnetic conductive layer on the fixed layer, and a free layer further thereon, and forming bias magnets on both sides of the magneto-resistive effect element, comprising a step of forming a magneto-resistive effect film in a trapezoidal shape having a specified abutting angle by means of ion milling through a resist mask of overhang structure, in which the anti-ferromagnetic layer is etched to a position of 30% or less of the depth at the step of forming the magneto-resistive effect film in a trapezoidal shape.

According to the invention, comprising a step of forming a magneto-resistive effect film in a trapezoidal shape having a specified abutting angle by ion milling through a resist mask of overhang structure, in which the anti-ferromagnetic layer is etched to a position of 30% or less of the depth at the step of forming the magneto-resistive effect film in a trapezoidal shape, the anti-ferromagnetic layer is left over by more than 70%, and it is used as the bypass for the electrode film, so that the wiring resistance of the lead electrode may be decreased.

The manufacturing method of magneto-resistive effect type head in another aspect of the invention is a manufacturing method of a magneto-resistive effect type head for manufacturing a magneto-resistive effect type magnetic head composed by forming on a substrate a fixed layer composed of an anti-ferromagnetic layer and a magnetic layer thereon, a nonmagnetic conductive layer on the fixed layer and a free layer further thereon, and forming bias magnets on both sides of the magneto-resistive effect element, comprising a step of forming a magneto-resistive effect film in a trapezoidal shape having a specified abutting angle by means of ion milling through a resist mask of overhang structure, and a step of forming bias magnet films for filling in sides of the trapezoidal magneto-resistive effect film, in which a TiW film is used as a base film of the bias magnet films, and the film thickness of the TiW film is set at 3 nm to 5 nm.

According to the invention, comprising a step of forming a magneto-resistive effect film in a trapezoidal shape having a specified abutting angle by means of ion milling through a resist mask of overhang structure, and a step of forming bias magnet films for filling in sides of the trapezoidal magneto-resistive effect film, in which by using a TiW film as a base film of the bias magnet films, and setting the film thickness of the TiW film at 3 nm to 5 nm, the magnetic characteristic of the bias magnet films can be enhanced.

DETAILED DESCRIPTION OF THE PREFERRED EMBODIMENTS

Figure 1:
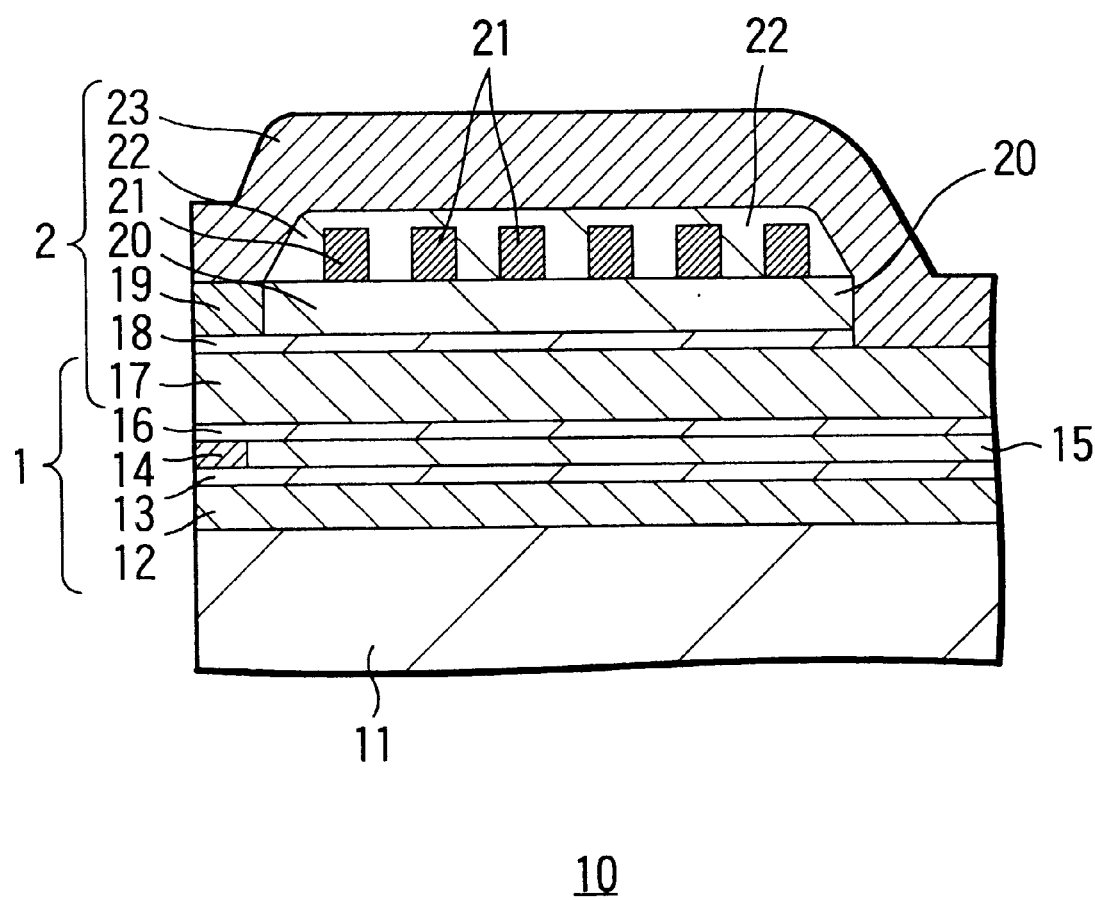
FIG. 1 is an outline structural diagram (sectional view) of a thin film magnetic head according to the invention.

The invention presents a manufacturing method of magneto-resistive effect type head, that is, a manufacturing method of magneto-resistive effect type head for manufacturing a magneto-resistive effect type magnetic head composed by forming a fixed layer composed of an anti-ferromagnetic layer and a magnetic layer thereon, a nonmagnetic conductive layer thereon, and a free layer on a substrate, and forming bias magnets at both sides of the magneto-resistive effect element, comprising a step of forming a magneto-resistive effect film in a trapezoidal shape having a specified abutting angle by ion milling through a resist mask of overhang structure, in which the angle of ion milling is 5° or less to the normal of the substrate surface.

The invention further presents a manufacturing method of a magneto-resistive effect type head, that is, a manufacturing method of a magneto-resistive effect type head for manufacturing a magneto-resistive effect type magnetic head composed by forming on a substrate a fixed layer composed of an anti-ferromagnetic layer and a magnetic layer thereon, a nonmagnetic conductive layer on the fixed layer, and a free layer further thereon, and forming bias magnets on both sides of the magneto-resistive effect element, comprising a step of forming a magneto-resistive effect film in a trapezoidal shape having a specified abutting angle by way of ion milling through a resist mask of overhang structure, a step of forming bias magnet films for filling in sides of the trapezoidal magneto-resistive effect film, and a step of forming an electrode film to overlap partly with the magneto-resistive effect film through the resist mask, in which the angle of ion beam sputtering when forming the electrode film is 30° or less to the normal of the substrate surface.

The invention further presents a manufacturing method of a magneto-resistive effect type head, that is, a manufacturing method of a magneto-resistive effect type head for manufacturing a magneto-resistive effect type magnetic head composed by forming on a substrate a fixed layer composed of an anti-ferromagnetic layer and a magnetic layer thereon, a nonmagnetic conductive layer on the fixed layer, and a free layer further thereon, and forming bias magnets on both sides of the magneto-resistive effect element, comprising a step of forming a magneto-resistive effect film in a trapezoidal shape having a specified abutting angle by way of ion milling through a resist mask of overhang structure, in which the anti-ferromagnetic layer is etched to a position of 30% or less of the depth at the step of forming the magneto-resistive effect film in a trapezoidal shape.

The invention further presents a manufacturing method of a magneto-resistive effect type head, that is, a manufacturing method of a magneto-resistive effect type head for manufacturing a magneto-resistive effect type magnetic head composed by forming on a substrate a fixed layer composed of an anti-ferromagnetic layer and a magnetic layer thereon, a nonmagnetic conductive layer on the fixed layer, and a free layer further thereon, and forming bias magnets at both sides of the magneto-resistive effect element, comprising a step of forming a magneto-resistive effect film in a trapezoidal shape having a specified abutting angle by way of ion milling through a resist mask of overhang structure, and a step of forming bias magnet films for filling in sides of the trapezoidal magneto-resistive effect film, in which a TiW film is used as a base film of the bias magnet films, and the film thickness of the TiW film is 3 nm to 5 nm.

FIG. 1 is an outline structural diagram (sectional view) of a thin film magnetic head according to the invention. The sectional view in FIG. 1 is a sectional view of the surface vertical to the so-called air bearing surface (ABS) facing the magnetic recording medium.

This thin film magnetic head 10 is a composite type magnetic head composed by integrally laminating a magneto-resistive effect type head (MR head) 1 for reproduction only and an inductive type head 2 for recording only.

The MR head 1 has an MR element 1 with a magneto-resistive effect disposed on a lower shield 12 of magnetic film formed on a nonmagnetic substrate 11 by way of a lower layer gap film 13.

Behind the MR element 14, an insulating film 15 of $Al_2O_3$ is buried to fill in the step of the MR element 14.

On the MR element 14, an intermediate shield 17 of magnetic film is formed through an upper layer gap film 16.

The gap of the MR head 1 is formed by the lower layer gap film 13 and upper layer gap film 16.

On the other hand, the inductive type head 2 has the intermediate shield 17 for composing the MR head 1 as the lower layer magnetic core, and a recording gap film 18 of, for example, $SiO_2$ or $Al_2O_3$ is formed on this intermediate shield 17.

At the tip end side facing the magnetic recording medium on the recording gap film 18, an upper layer pole 19 of magnetic film is formed. Behind the upper layer pole 19, an insulating layer 20 is buried to form a flat surface.

A coil 21 is formed on this flat surface, and an insulating film 22 is formed to cover this coil 21. Further above the insulating film 22, there is a back yoke 23 of magnetic film connected to the upper layer pole 19. The upper layer pole 19 and back yoke 23 correspond to the upper layer magnetic core. Behind the back yoke 23, a magnetic path connected to the intermediate shield 17 is formed.

Figure 2:
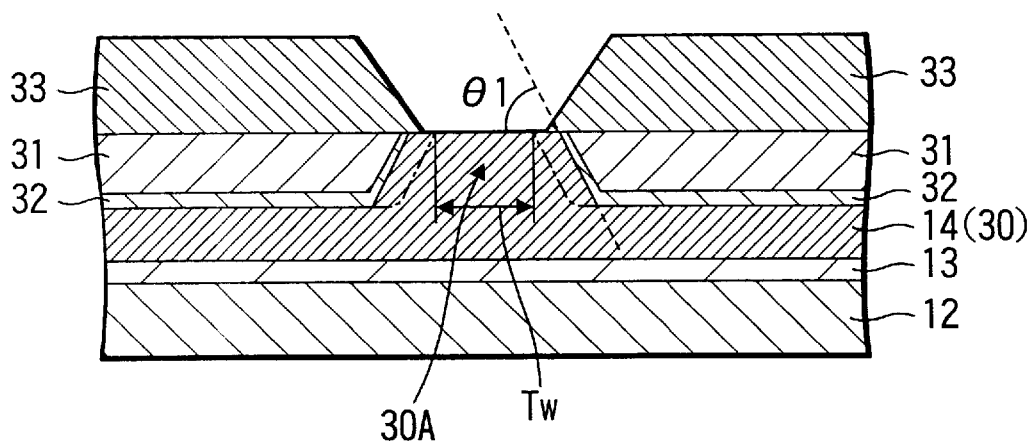
FIG. 2 is a magnified sectional view near the MR element of the thin film magnetic head in FIG. 1.

Further, in the thin film magnetic head 10 in FIG. 1, a magnified sectional view near the MR element 14 is shown in FIG. 2. FIG. 2 is a sectional view of a surface parallel to the ABS.

The MR element 14 is composed of an MR film 30 made of the spin valve element, and bias magnet films 31 of ferromagnetic film are disposed at both flanks of the MR film 30.

The bias magnet films 31 apply a bias magnetic field for maintaining the uniaxial anisotropy of the MR element 14.

The bias magnet film 31 is formed of, for example, CoNiPt film or CoCrPt film, and when forming the bias magnet film 31, a base film 32 is formed beneath the bias magnet film 31.

Supposing the material and film thickness of the base film 32 of the bias magnet film 31 to be variable parameters, the characteristic (for example, the coercive force) of the bias magnet film 31 varies.

Preferably, using TiW as the material for the base film 32 of the bias magnet film 31, the film thickness of the base film 32 made of TiW is set at 3 to 5 nm. As a result, the bias magnet film 31 is formed as a film having a favorable characteristic.

The central part 30A as the magnetic sensible part of the MR film 30 is trapezoidal in shape, and the surface at the bias magnet film 31 side is a slope.

The angle (abutting angle) $\theta 1$ of this slope to the substrate is preferably 15° or more.

If the abutting angle $\theta 1$ is less than 15°, the effect of the bias magnetic field from the bias magnet films 31 is weak, and adverse effects on the characteristic of the MR head 1 cannot be ignored.

The upper limit of the abutting angle $\theta 1$ is possiblly up to 90° unless there is no problem in throwing power of the bias magnet films 31 near the trapezoidal MR part 30A.

On the MR film 30 and bias magnet films 31, an electrode film 33 to be connected to the MR element 14 is formed.

The electrode film 33 is preferred to be formed so that only the end portion is present on the MR film 30, and should be controlled so as not to be positioned on the dead zone of the MR film.

The dead zone corresponds to the region near the bias magnet film 31 near the slope of the trapezoidal shape, and this is the region in which the magnetic field from the magnetic recording medium cannot be detected because of the strong bias magnetic field from the bias magnet films 31. In FIG. 2, the boundary of such a dead zone is indicated by chain line.

The effective track width of the MR element 14 is a width Tw of the region other than the dead zone as shown in FIG. 2, and if the electrode film 33 is formed partly on the dead zone, the magnetic field cannot be detected in the portion forming the electrode film 33, and the effective track width Tw becomes narrower.

When the electrode film 33 is formed on the dead zone only, the effective track width Tw of the MR element 14 is invariable.

Figure 3:
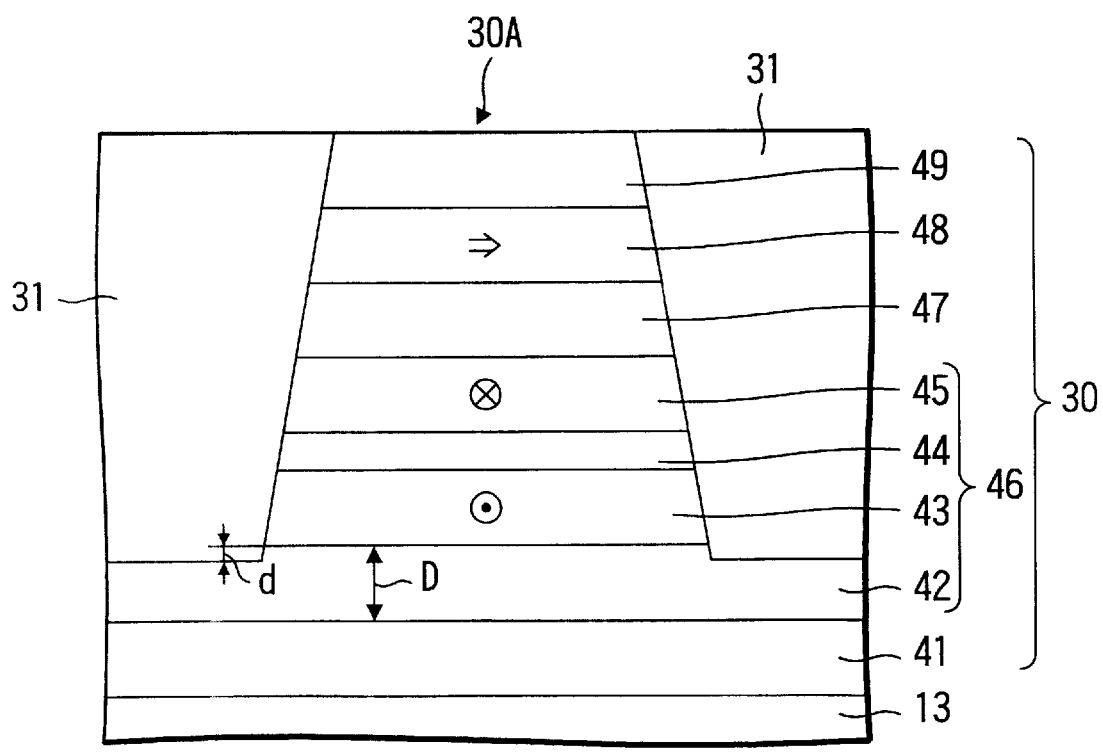
FIG. 3 is a schematic sectional view showing a specific configuration of a laminate structure of the MR element in FIG. 2.

A specific configuration of the laminate structure of the MR element 14 composed of the spin valve element is shown in a schematic sectional view in FIG. 3.

Sequentially from the lower layer gap 13 side, a contact layer 41 made of, for example, Ta, an anti-ferromagnetic layer 42 made of, for example, PtMn, a first ferromagnetic layer 43 made of, for example, CoFe or NiFe, an intermediate layer 44 made of, for example, Ru, and a second ferromagnetic layer 45 made of, for example, CoFe or NiFe are disposed.

By the four layers of the anti-ferromagnetic layer 42, first ferromagnetic layer 43, intermediate layer 44, and second ferromagnetic layer 45, a fixed layer 46 of the spin valve element is composed.

The anti-ferromagnetic layer 42 is for fixing the direction of magnetization of the ferromagnetic layers 43 and 45 in the fixed layer 46. By the anti-ferromagnetic layer 42, for example as shown in the diagram, the first ferromagnetic layer 43 is fixed in the magnetization in the longitudinal direction, and the second ferromagnetic layer 45 is fixed in the magnetization in the depth direction.

On the fixed layer 46, a nonmagnetic conductive layer 47 made of, for example, Cu, a third ferromagnetic layer 48 made of, for example, CoFe or NiFe, and a contact layer and gap layer 49 made of, for example, Ta are formed.

The third ferromagnetic layer 48 forms a free layer of the spin valve element.

The nonmagnetic conductive layer 47 separates the free layer 48 and fixed layer 46, and passes a current corresponding to the magnetic field from the magnetic recording medium in a direction parallel to the sheet of paper of the drawing.

The contact layer 49 is used for protection of the MR film 30 in process.

This MR film 30 is formed in a so-called bottom spin valve structure, that is, the fixed layer 46 of the spin valve element is disposed at the lower side, that is, at the substrate side, rather than the free layer 48.

In this laminate structure, the anti-ferromagnetic layer 42 is formed in a trapezoidal shape to the depth d in part, and the bias magnet film 31 is buried at the outer side. In FIG. 3, the base film 32 is omitted.

This depth d is preferred to be 30% or less of the film thickness D of the anti-ferromagnetic layer 43, and in other portion than the trapezoidal MR part 30A, the anti-ferromagnetic layer 42 should be left over in a thickness of 70% or more. Thus, the anti-ferromagnetic layer 42 can be formed as a bypass route for the electrode layer 33 and the wiring connected to the electrode layer 33, and the lead wiring resistance can be decreased. As a result, heat generation by lead wiring resistance can be suppressed, and the service life of the MR element 14 can be extended.

In succession, as an embodiment of the manufacturing method of magneto-resistive effect type head of the invention, the manufacturing process of the portion of the MR head 1 of the thin film magnetic head 10 shown in FIG. 1 to FIG. 3 is explained.

Figure 4A:
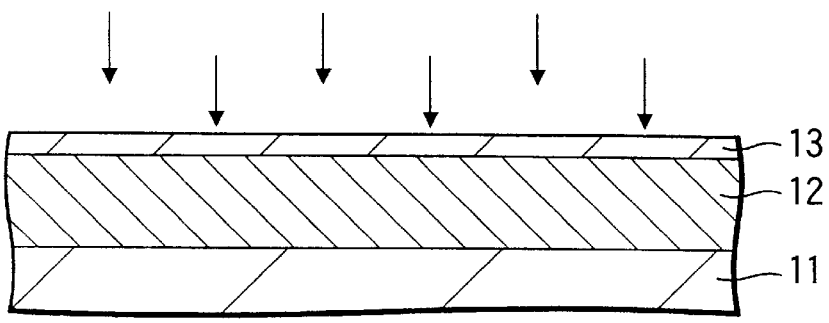
FIGS. 4A to D are process charts showing the manufacturing process of the thin film magnetic head shown in FIG. 1 to FIG. 3.

First, as shown in FIG. 4A, on a nonmagnetic substrate 11 made of ceramics, a lower layer shield 12 made of magnetic material (for example, sendust or NiFe) is formed, and a lower layer gap film 13 for the MR head 1 made of oxide film or nitride film is formed thereon by sputtering method.

Although not shown, between the nonmagnetic substrate 11 and lower layer shield 12, a nonmagnetic film made of, for example, $Al_2O_3$ is formed.

Figure 4B:
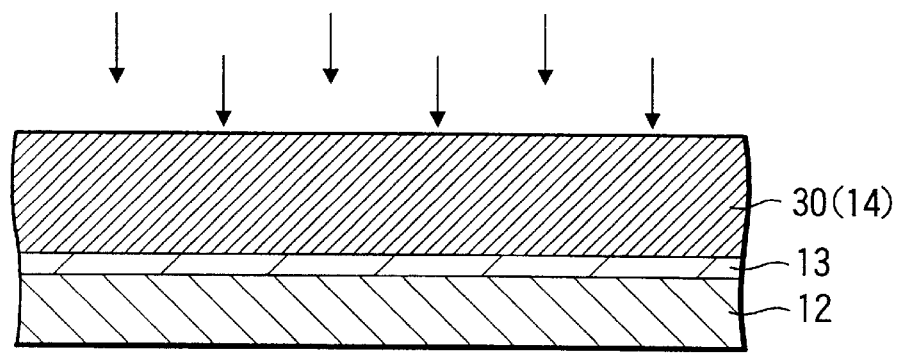

Next, as shown in FIG. 4B, on the lower layer gap film 13, each layer of the MR film 30 (14) having the laminate structure shown in FIG. 3 is sequentially formed by sputtering method. After FIG. 4B, the nonmagnetic substrate 11 is not shown.

Figure 4C:
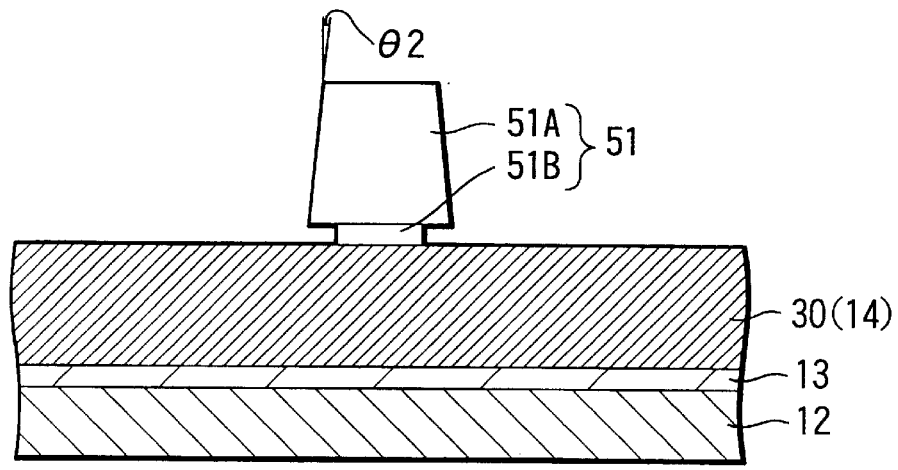

On the MR film 30, as shown in FIG. 4C, a resist pattern 51 of overhang structure composed of a wide portion 51A and a narrow portion 51B beneath is formed. At the side of the wide portion 51A of the resist pattern, a slope of which angle θ2 to the normal of the substrate surface is 10° or less is formed, and the section is formed in a trapezoidal shape of a smaller top side.

Figure 4D:
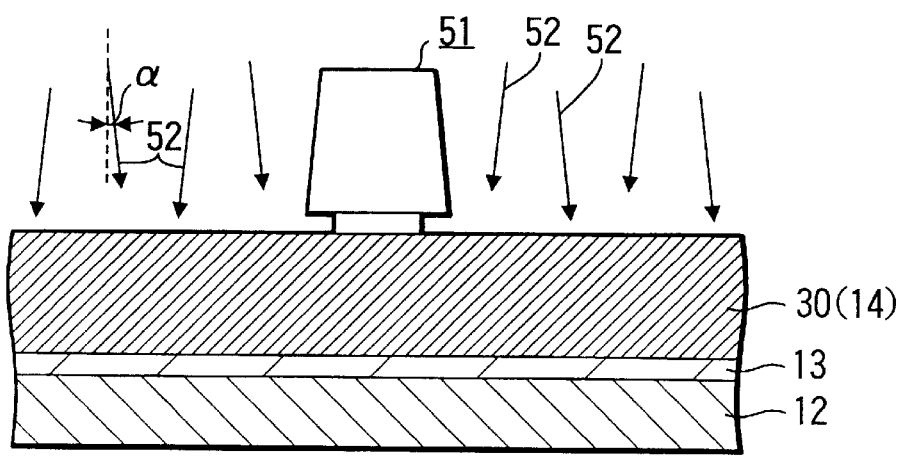

Then, as shown in FIG. 4D, using the resist pattern 51 of overhang structure as the mask, the MR film 30 is processed by ion milling 52.

At this time, the angle α of the ion milling 52 to the normal of the substrate surface is 5° or less.

Figure 5A:
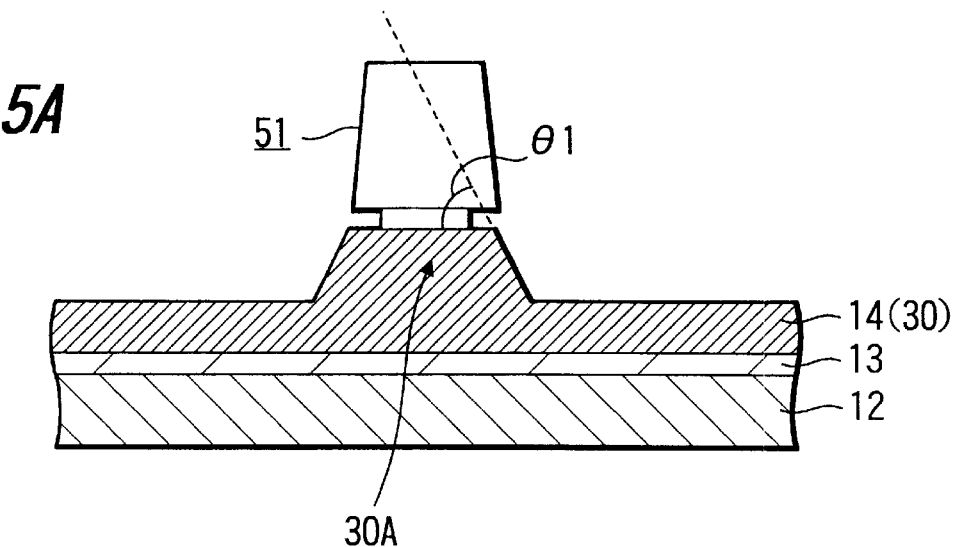
FIGS. 5A, B are process charts showing the manufacturing process of the thin film magnetic head shown in FIG. 1 to FIG. 3.
Figure 5B:
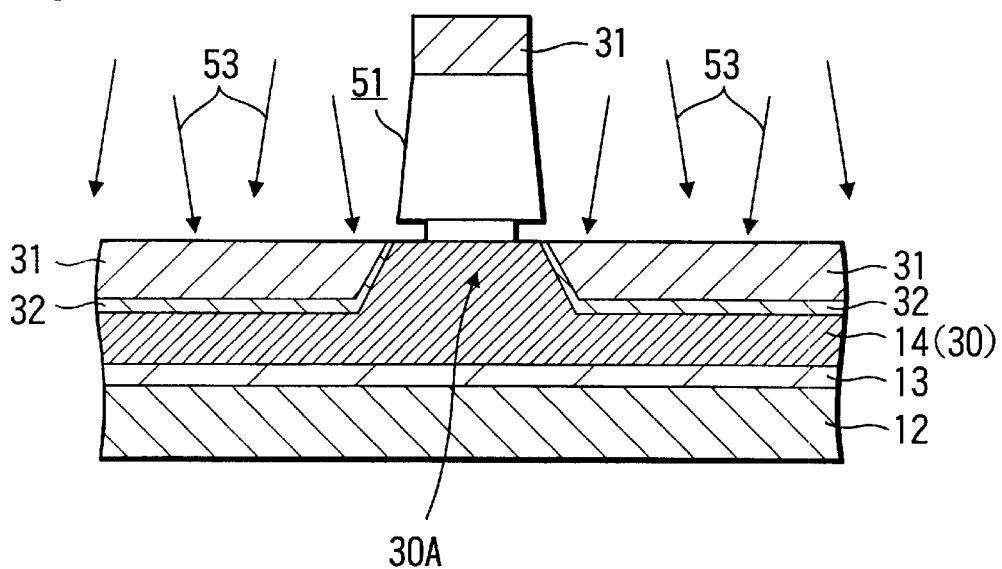

As a result of the ion milling 52, as shown in FIG. 5E, a trapezoidal MR part 30A is formed in the central part of the MR film 30.

Depending on the angle α of the ion milling 52 to the normal of the substrate surface, the abutting angle of the MR part 30A varies.

Thus, by setting the angle α of the ion milling 52 to the normal of the substrate surface at 5° or less, the abutting angle θ1 is formed at 15° or more.

Besides, the condition of the ion milling 52 is controlled so that the trapezoidal MR part 30A comes to the depth of within 30% of the film thickness of the anti-ferromagnetic layer 42 shown in FIG. 3.

At both sides of the trapezoidal MR part 30A, base films 32 of TiW are formed by using the resist pattern 51 of the overhang shape as the mask.

Further, as shown in FIG. 5F, using the resist pattern 51 as the mask, bias magnet films 31 made of, for example, CoNiPt or CoCrPt are formed by ion beam sputtering 53 so as to fill in the both sides of the trapezoidal MR part 30A.

At this time, the direction of ion beam sputtering 53 is preferred to be within 10° to the normal of the substrate surface.

Figure 6A:
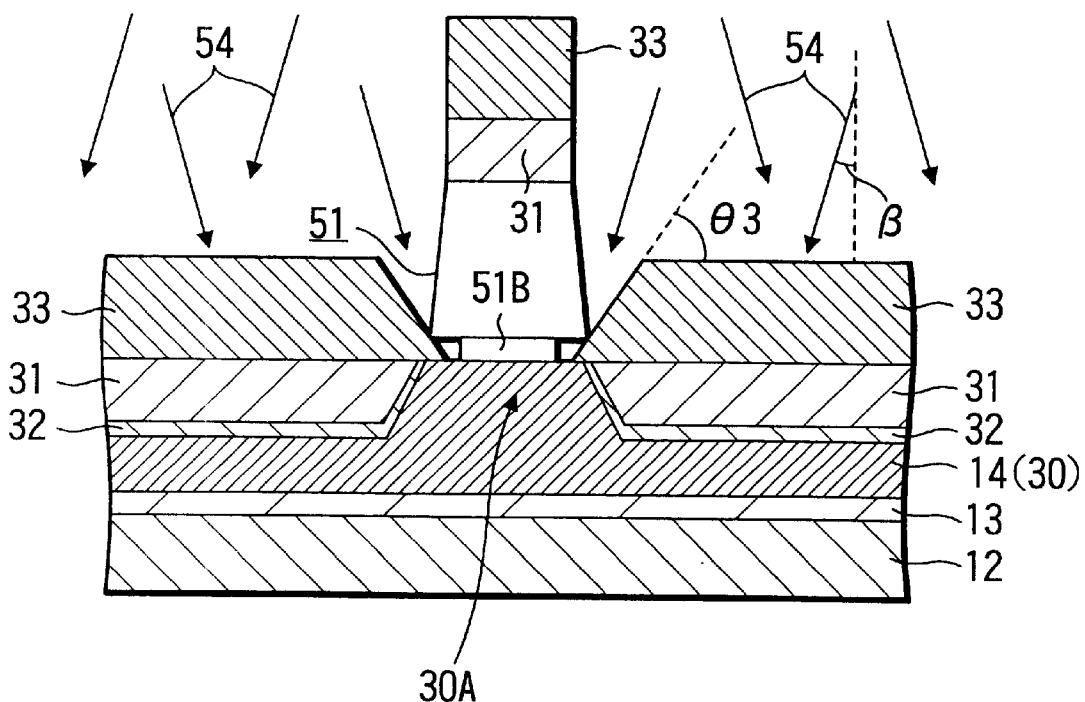
FIGS. 6A, B are process charts showing the manufacturing process of the thin film magnetic head shown in FIG. 1 to FIG. 3.
Figure 6B:
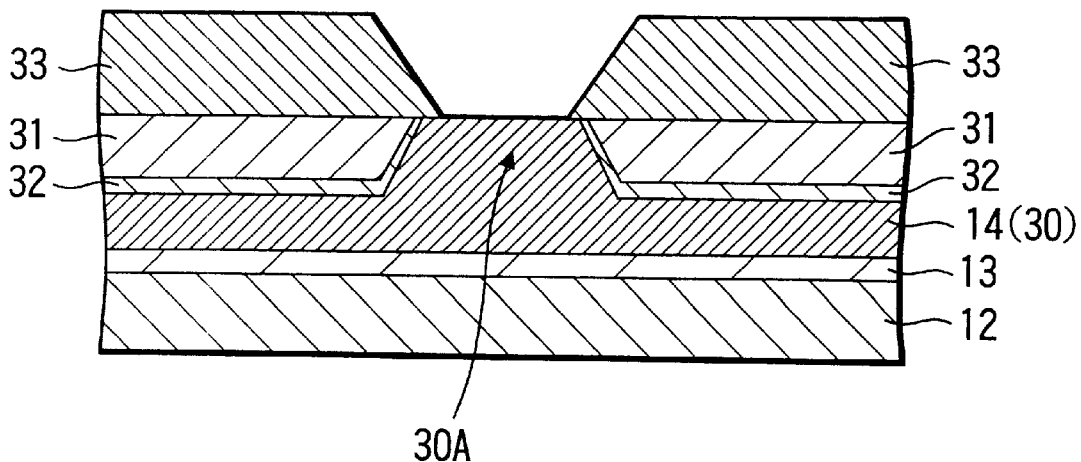

In succession, as shown in FIG. 6G, using the resist pattern 51 as the mask, an electrode film 33 is formed by ion beam sputtering 54.

In this forming process of the electrode film 33, supposing the angle β of the direction of the ion beam sputtering 54 to the normal of the substrate surface to be a parameter, the throwing power of the electrode film 33 varies depending on this angle β.

At this time, the direction of the ion beam sputtering 54 is preferred to be set so that the angle β to the normal of the substrate surface may be within 30°.

As a result, the forming angle θ3 of the electrode film 33 is controlled, and invasion of the narrow portion 51B of the resist pattern 51 into the surrounding notch portion can be limited.

Therefore, the electrode film 33 can be controlled so as not to be positioned on the dead zone of the MR film 30.

This is followed by the lift-off process. Specifically, the resist pattern 51 is dissolved by a solvent, and the bias magnet film 31 and electrode film 33 on the resist pattern 51 are removed.

Thus, as shown in FIG. 6H, only the electrode film 33 of specified pattern is left over, and the MR element 14 of the configuration shown in FIG. 2 can be formed.

According to the embodiment, comprising the step (FIG. 4D) of forming the MR film 30 in a trapezoidal shape 30A having a specified abutting angle θ1 by ion milling 52 through a resist mask 51 of overhang structure, the angle α of this ion milling 52 is set at 5° or less to the normal of the substrate surface, and therefore the abutting angle θ1 can be set at 15° or more to the substrate surface.

As a result, the bias magnetic field can be favorably applied from the bias magnet film 31, and the characteristic of the MR head 1 can be stabilized.

At the forming step of the electrode film 33 (FIG. 6G), the angle β of ion beam sputtering 54 is set at 30° or less to the normal of the substrate surface, so that it is effective to decrease invasion of the electrode film 33 into the bottom of the resist mask 51 of overhang structure.

As a result, it is effective to control the position of the edge of the electrode film 33 in the width direction on the MR film 30 within the dead magnetic zone.

Therefore, the effective track width Tw of the MR element 14 can be formed in a specified width, and the reproduction characteristic of the MR head 1 can be stabilized.

At the step of forming the MR film 30 in a trapezoidal shape 30A, by etching to a position of 30% or less of the depth of the anti-ferromagnetic layer 42, the anti-ferromagnetic layer 42 is left over by more than 70%, and it is used as the bypass for the electrode film 33, so that the wiring resistance of the lead electrode may be decreased.

As a result, the resistance of the electrode and wiring is lowered, and the reliability (service life) of the MR head 1 can be enhanced.

Using TiW as the base film 32 of the bias magnet films 31, the film thickness of TiW is set at 3 nm to 5 nm, so that the magnetic characteristic of the bias magnet films 31 can be enhanced.

Therefore, according to the embodiment, by controlling the effective track width Tw, dimensions and shape of the MR element 14, the stability of the characteristic of the MR head 1 being manufactured can be enhanced.

Moreover, the characteristic of the bias magnet film 31 can be optimized, and a stable bias magnetic field can be supplied to the MR element 14.

In the embodiment, the invention is explained by the composite type head composed of MR head 1 and inductive type head 2, but the invention may similarly applied to manufacture of MR head of other structure.

In particular, when the MR element has a bottom spin valve structure in which the fixed layer is disposed at the substrate side, it is notably effective to optimize the characteristic of the MR film and bias magnet film and stabilize the MR head.

In each layer of the MR element 14 having the bottom spin valve structure, other materials than mentioned above may be also used.

The invention is not limited to the illustrated embodiment alone, but may be changed and modified in various forms within the scope and true spirit of the invention.

As described herein, according to the invention, the effective track width, dimensions and shape of the magneto-resistive effect element can be controlled, so that the stability of the magneto-resistive effect type head being manufactured can be enhanced.

Moreover, by optimizing the characteristic of the bias magnet film, a stable bias magnetic field can be supplied to the magneto-resistive effect element.

Therefore, the magneto-resistive effect type head of stable characteristics can be manufactured by the invention.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A manufacturing method of a magneto-resistive effect type head for manufacturing a magneto-resistive effect type magnetic head composed by forming on a substrate a fixed layer composed of an anti-ferromagnetic layer and a magnetic layer thereon, a nonmagnetic conductive layer on the fixed layer, and a free layer further thereon, and forming bias magnets on both sides of said magneto-resistive effect element, comprising:

a step of forming a magneto-resistive effect film in a trapezoidal shape having a specified abutting angle by means of ion milling through a resist mask of overhang structure, wherein the angle of ion milling is 5° or less to the normal of the substrate surface.

2. A manufacturing method of magneto-resistive effect type head for manufacturing a magneto-resistive effect type magnetic head composed by forming on a substrate a fixed layer composed of an anti-ferromagnetic layer and a magnetic layer thereon, a nonmagnetic conductive layer on the fixed layer, and a free layer further thereon, and forming bias magnets on both sides of said magneto-resistive effect element, comprising:

a step of forming a magneto-resistive effect film in a trapezoidal shape having a specified abutting angle by means of ion milling through a resist mask of overhang structure, a step of forming bias magnet films for filling in sides of said trapezoidal magneto-resistive effect film, and a step of forming an electrode film to overlap partly with the magneto-resistive effect film through said resist mask, wherein the angle of ion beam sputtering when forming said electrode film is 30° or less to the normal of the substrate surface.

3. A manufacturing method of a magneto-resistive effect type head for manufacturing a magneto-resistive effect type magnetic head composed by forming on a substrate a fixed layer composed of an anti-ferromagnetic layer and a magnetic layer thereon, a nonmagnetic conductive layer on the fixed layer and a free layer further thereon, and forming bias magnets at both sides of said magneto-resistive effect element, comprising:

a step of forming a magneto-resistive effect film in a trapezoidal shape having a specified abutting angle by means of ion milling through a resist mask of overhang structure, wherein said anti-ferromagnetic layer is etched to a position of 30% or less of the depth at the step of forming said magneto-resistive effect film in a trapezoidal shape.

4. A manufacturing method of magneto-resistive effect type head for manufacturing a magneto-resistive effect type magnetic head composed by forming on a substrate a fixed layer composed of an anti-ferromagnetic layer and a magnetic layer thereon, a nonmagnetic conductive layer on the fixed layer, and a free layer further thereon, and forming bias magnets on both sides of said magneto-resistive effect element, comprising:

a step of forming a magneto-resistive effect film in a trapezoidal shape having a specified abutting angle by means of ion milling through a resist mask of overhang structure, and a step of forming bias magnet films for filling in sides of said trapezoidal magneto-resistive effect film, wherein a TiW film is used as a base film of said bias magnet films, and the film thickness of said TiW film is 3 nm to 5 nm.

5. A manufacturing method of a magneto-resistive effect type head for manufacturing a magneto-resistive effect type magnetic head composed by forming on a substrate a magneto-resistive effect element having a free layer, a nonmagnetic conductive layer thereon, and a fixed layer composed of a magnetic layer on the nonmagnetic conductive layer and an anti-ferromagnetic layer further thereon, and forming bias magnets on both sides of said magneto-resistive effect element, comprising:

a step of forming a magneto-resistive effect film in a trapezoidal shape having a specified abutting angle by means of ion milling through a resist mask of overhang structure, wherein the angle of ion milling is 5° or less to the normal of the substrate surface.

6. A manufacturing method of magneto-resistive effect type head for manufacturing a magneto-resistive effect type magnetic head composed by forming on a substrate a magneto-resistive effect element having a free layer, a nonmagnetic conductive layer thereon, and a fixed layer composed of a magnetic layer on the nonmagnetic conductive layer and an anti-ferromagnetic layer further thereon, and forming bias magnets at both sides of said magneto-resistive effect element, comprising:

a step of forming a magneto-resistive effect film in a trapezoidal shape having a specified abutting angle by means of ion milling through a resist mask of overhang structure, a step of forming bias magnet films for filling in sides of said trapezoidal magneto-resistive effect film, and a step of forming an electrode film to overlap partly with the magneto-resistive effect film through said resist mask, wherein the angle of ion beam sputtering when forming said electrode film is 30° or less to the normal of the substrate surface.

7. A manufacturing method of magneto-resistive effect type head for manufacturing a magneto-resistive effect type magnetic head composed by forming on a substrate a magneto-resistive effect element having a free layer, a nonmagnetic conductive layer thereon, and a fixed layer composed of a magnetic layer on the nonmagnetic conductive layer and an anti-ferromagnetic layer further thereon, and forming bias magnets on both sides of said magneto-resistive effect element, comprising:

a step of forming a magneto-resistive effect film in a trapezoidal shape having a specified abutting angle by means of ion milling through a resist mask of overhang structure, wherein said anti-ferromagnetic layer is etched to a position of 30% or less of the depth at the step of forming said magneto-resistive effect film in a trapezoidal shape.

8. A manufacturing method of magneto-resistive effect type head for manufacturing a magneto-resistive effect type magnetic head composed by forming a magneto-resistive effect element having a free layer, a nonmagnetic conductive layer thereon, and a fixed layer composed of a magnetic layer thereon and an anti-ferromagnetic layer thereon on a substrate, and forming bias magnets at both sides of said magneto-resistive effect element, comprising:

a step of forming a magneto-resistive effect film in a trapezoidal shape having a specified abutting angle by ion milling through a resist mask of overhang structure, and a step of forming bias magnet films for filling in sides of said trapezoidal magneto-resistive effect film, wherein a TiW film is used as a base film of said bias magnet films, and the film thickness of said TiW film is 3 nm to 5 nm.

* * * * *